June 5, 1956

J. H. THOMSEN ET AL 2,749,137

VARIABLE HEIGHT VEHICLE

Filed Aug. 24, 1950

INVENTORS
TED N. GRANGER
JENS H. THOMSEN
BY
*A. Hiram Sturges*

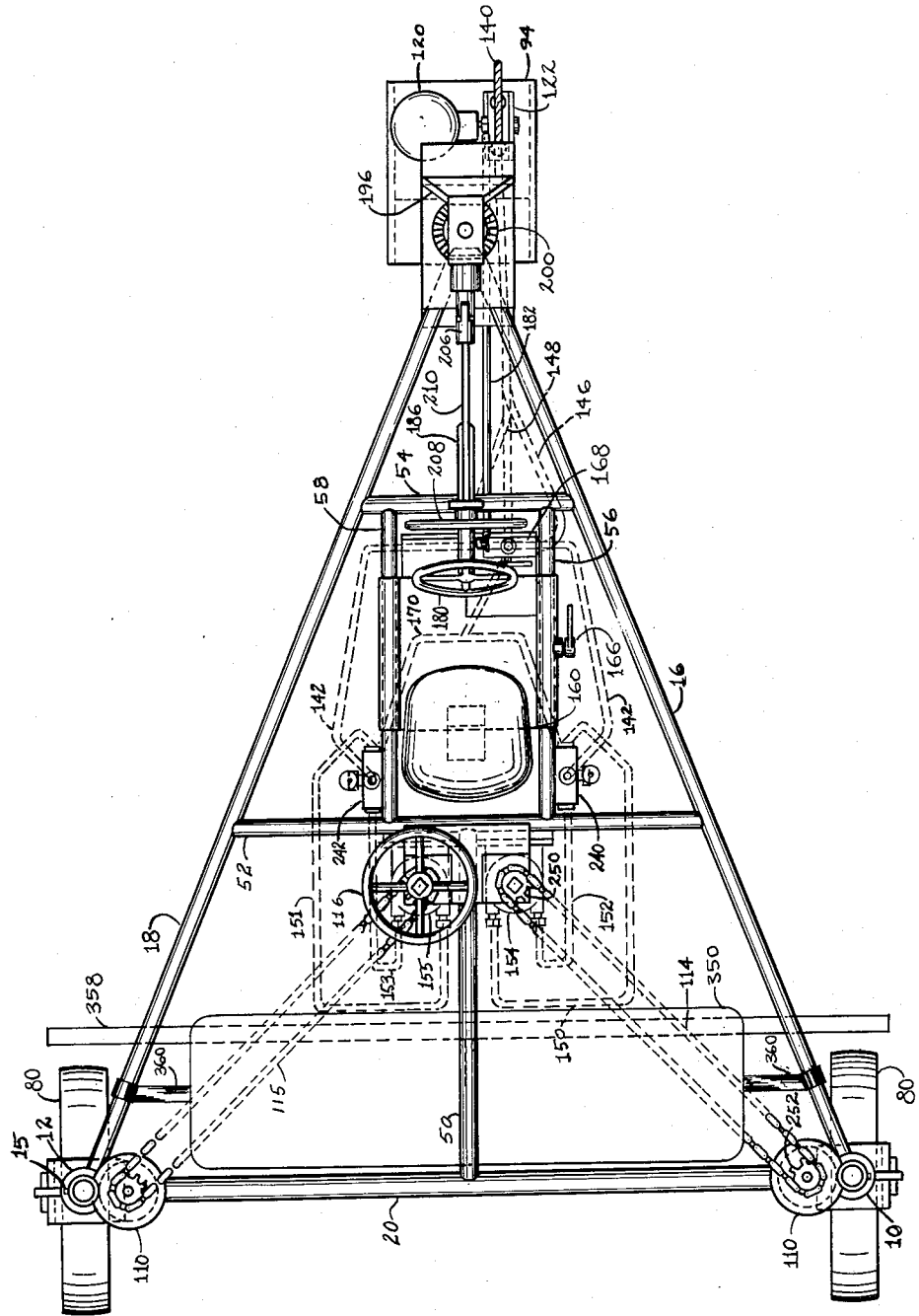

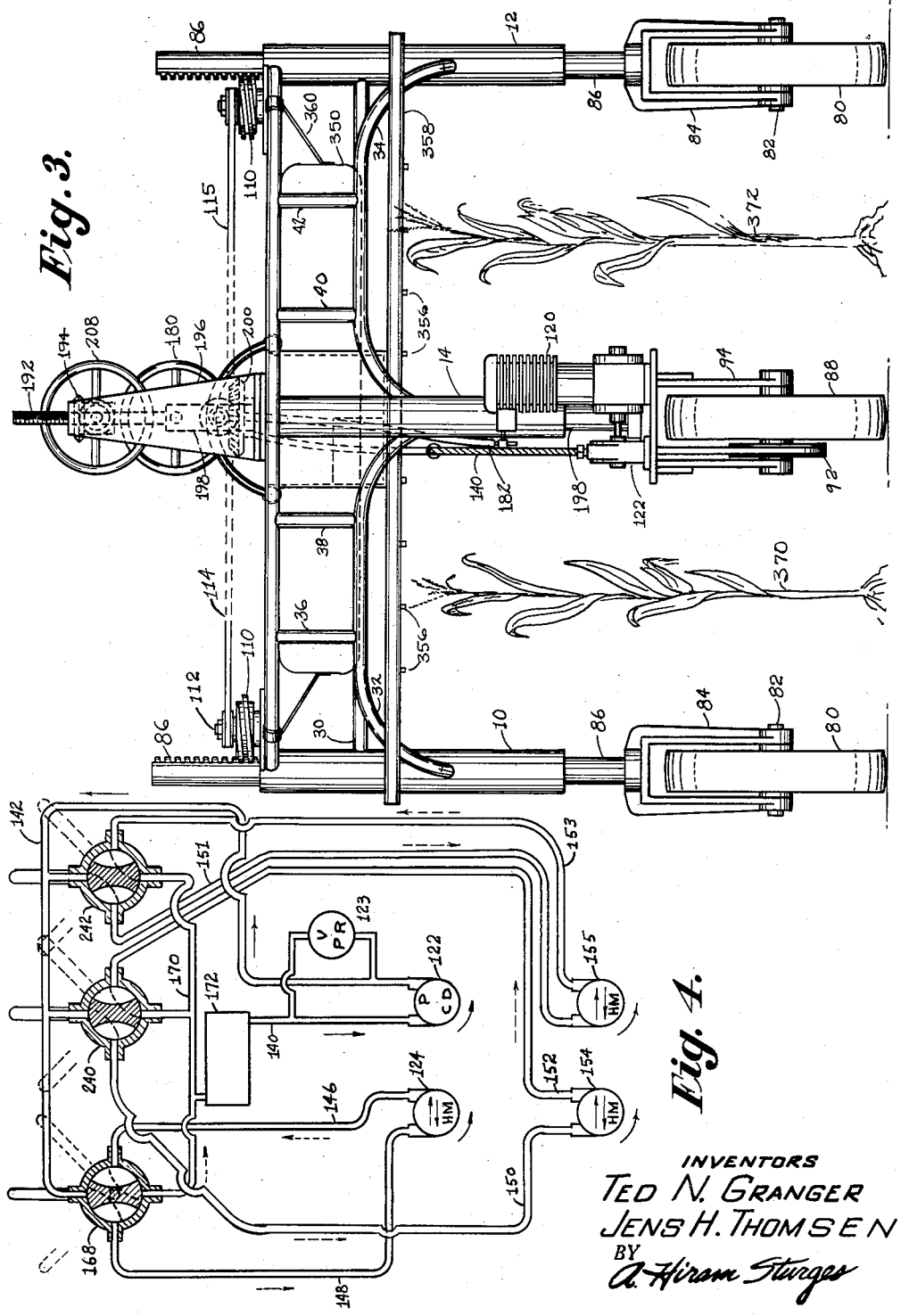

June 5, 1956  J. H. THOMSEN ET AL  2,749,137
VARIABLE HEIGHT VEHICLE
Filed Aug. 24, 1950  4 Sheets-Sheet 4

Inventors
JENS H. THOMSEN
TED N. GRANGER
By
A. Hiram Sturges
Attorney

United States Patent Office 2,749,137
Patented June 5, 1956

2,749,137

VARIABLE HEIGHT VEHICLE

Jens H. Thomsen and Ted N. Granger, North Bend, Nebr.

Application August 24, 1950, Serial No. 181,144

1 Claim. (Cl. 280—6)

This invention relates to vehicles used on farms and more particularly it is an object of this invention to provide a variable height vehicle for corn detasseling, cornspraying and the like.

The most effective means known for combating the corn borer is spraying the corn during a period of approximately ten days when the corn is of a height of five to eight feet. Tractors have been mounted high in the air in order to pass over the top of corn without damaging it for carrying spraying equipment for spraying the corn.

A high level tractor of this type is very unstable and cannot be driven on the side of a hill without danger of capsizing.

Accordingly, it is the main object of this invention to provide a vehicle the wheels of one side of which can be raised or lowered from the vehicle a greater distance than the wheel on the other side whereby the vehicle can remain on a level even though being driven around the side of a hill or over rough terrain.

A further object of the invention is to provide a vehicle the position of the main portion of which can be spaced above its wheels various distances for elevating and lowering the upper portion of the vehicle whereby spraying equipment attached thereto can be raised and lowered when desired.

Yet a further object provides a vehicle as described the adjustment of which can be made from the driver's seat.

Yet a further object of the invention is to provide a vehicle which is adapted to be used in detasseling having an advantage of variable height.

A further object resides in the provision of hydraulic means for raising and lowering the frame of the vehicle with respect to the wheels thereof.

Still another object of the invention is to provide a rear wheel on one side which can be straightened apart from the frame than the wheel on the opposite side, hydraulically or by manual means.

Yet another object of the invention is to provide a device for the purpose described which is sturdy and durable in construction, reliable and efficient in operation, and relatively simple and inexpensive to manufacture, assemble and utilize.

Yet a further object is to provide means for steadying wheel carrying members of the invention, such means preferably comprising upright members slidably secured to the frame for upward and downward movements, the upright members each being secured at their lower ends to a rearward wheel carrying member.

Still a further object of the invention is to provide a machine as described that can be used in a lower position when high clearance is not needed to eliminate topheaviness and to provide a machine having many other uses.

Other and still further objects and advantages of the invention will become apparent from the following detailed description of a preferred embodiment thereof.

In the drawings:

Figure 2 is a top plan view of this invention, certain portions of the hydraulic system and portions of the roller chain drive also being shown in dotted lines.

Figure 1:
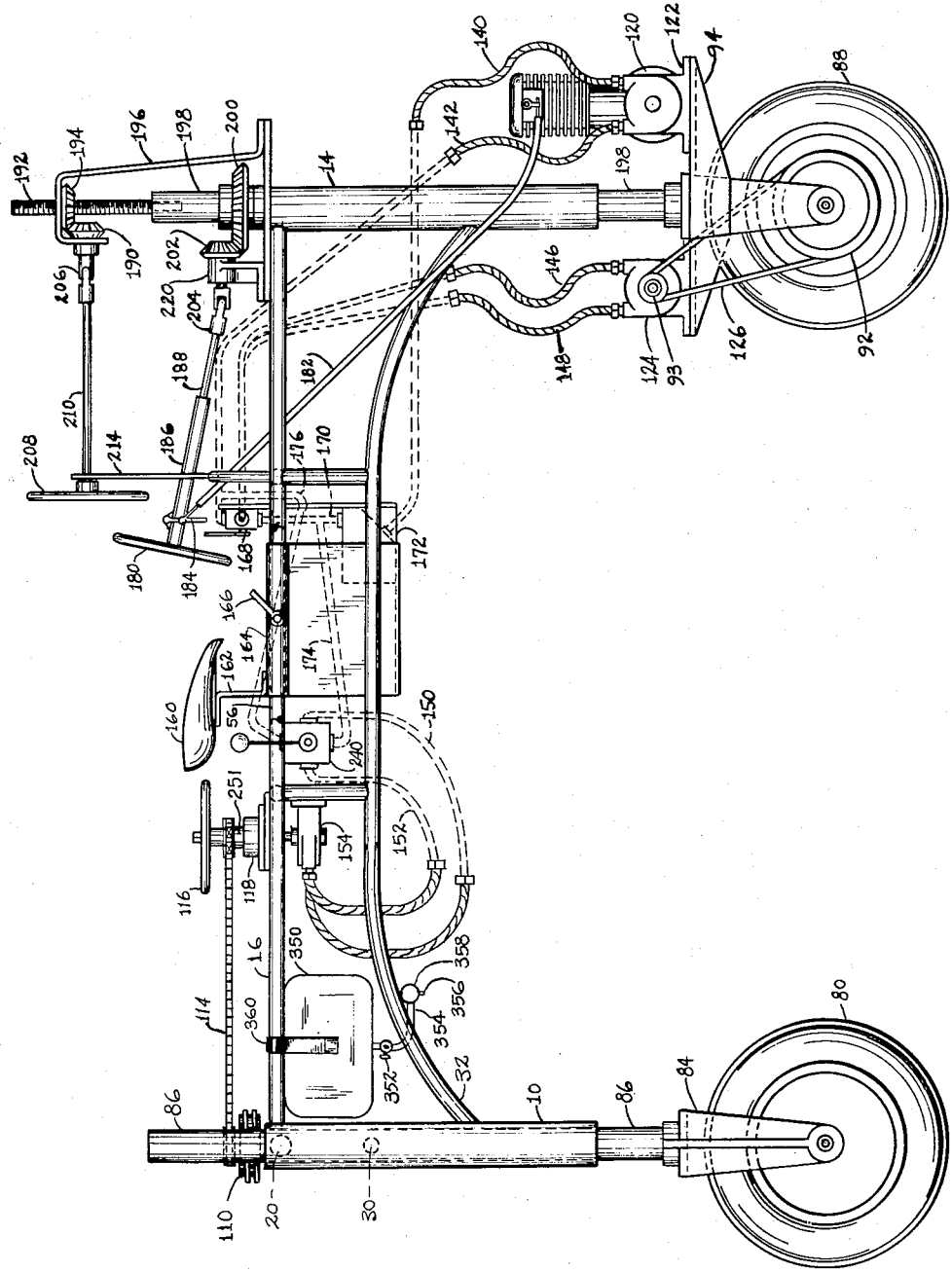
Figure 1 is a side elevation of this invention, certain portions of the hydraulic system being shown in dotted lines, the wheels being in partially raised position.

Figure 3 is a front elevation of the invention showing portions of the hydraulic system and roller chain drive in dotted lines. Figure 3 also shows how the frame and wheels span two rows of corn as illustrated by the corn stalks in the drawing. The drawing shows the wheels in a partially raised position.

Figure 4 is a diagrammatic illustration showing the hydraulic system for propelling the machine and also the system for raising and lowering the wheels of one side in relation to the other.

Figure 5:
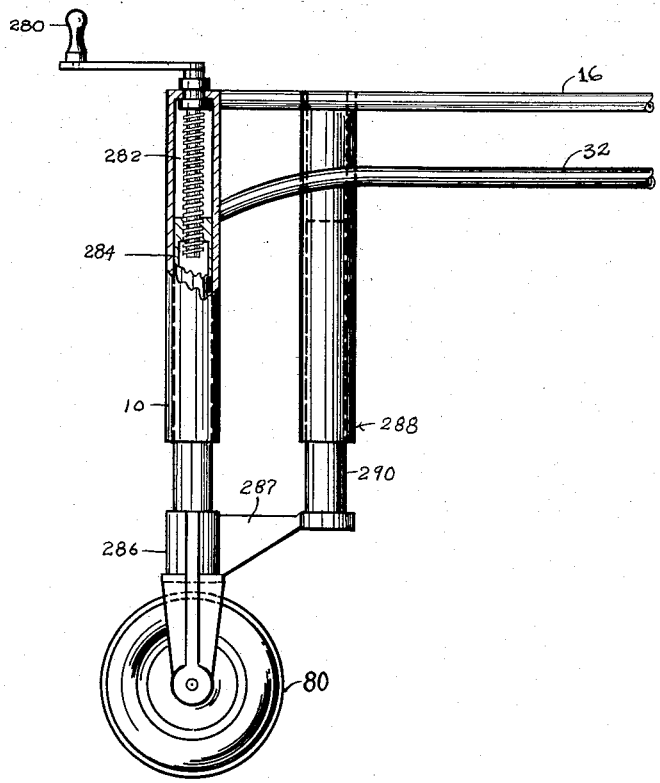

Figure 5 shows a portion of the frame and one rear wheel and illustrates another modification of the wheel raising means, a manual method.

As shown in Figures 1 and 2, the framework of the vehicle comprises three upright tubular guides 10, 12, and 14, 10 and 12 having internal keyways 15. These tubular guides are arranged in the form of an isosceles triangle and are secured together by three tubular frame members 16, 18, and 20, which latter form the perimeter of a triangle and are welded to the upper ends of the three upright guides 10, 12, and 14.

The lateral member 20 is the base of the aforementioned isosceles triangle. Below 16, 18, and 20 are three similar members 30, 32, and 34, separated from the upper members by vertical members 36, 38, 40, and 42 shown in Figure 3.

In Figure 2 a tubular member 50 bisects the triangle from the base to member 52, which latter is parallel to the base or lateral member 20. The member 50 forms the center of the machine. Members 56 and 58 are spaced an equal distance from the sides of the center, running forward from member 52 and in parallelism with the center. At the front the members 56 and 58 are welded to member 54 which is in parallelism with the members 20 and 52.

The operator's seat 160 is supported by a vertical bracket 162. The latter is attached at its lower end to an upwardly opening U-shaped bracket 164. This bracket 164 is suspended between the frame members 56 and 58, thus affording room for the operator's feet. The frame members 56 and 58 are telescopically disposed within tubular sections in the upper ends of the bracket 164 which permit the operator's seat to be moved forwardly and rearwardly to suit the length of the operator's legs.

A clamp 166, having a handle integral with its threaded shaft, screws into a bracket 164, thus clamping the seat into position after it has been adjusted.

The steering wheel 180 and its shaft 188 are journaled within the tubular section 186. The front end of the steering shaft 188 is attached to a universal joint 204. The forward part of this universal joint is attached to the shaft of the mitre gear 202, which latter is journaled within bearing brackets 220.

A further mitre gear 200 receives its rotary motion from the mitre gear 202. The vertical shaft 198 receives its rotary motion from a mitre gear 200 through a key, not shown. It receives its linear or upward and downward motion by action of the screw 192, and is journaled within the vertical guide member 14.

A hand wheel 208 is provided for raising or lowering the front wheel, and its shaft 210 is journaled within a bracket 214. The forward end of the shaft 210 is attached to the rear half of the universal joint 206. The forward half of the universal joint 206 is attached to the shaft of the mitre gear 190. A further mitre gear 194 receives its rotary motion from the mitre gear 190.

and is provided with internal threads which raise and lower the threaded member 192.

The throttle wire 182 extends from the carburetor of the motor 120 to the throttle 184 on the steering column 186, whereby the operator may control the speed of the motor 120 by manipulating the throttle 184.

The operator may raise and lower a rear wheel mechanically by turning the hand wheel 116. The wheel 80 is journaled about the axle 82 which latter is suspended in the bracket 84. The bracket 84 is attached to a member 86 which is telescopically disposed in the guide member 10. The member 86 receives its linear or upwardly and downwardly motion by means of teeth which engage with the worm gear 110.

As best seen in Figure 2 two right and left hand sprocket wheels 250 are provided in the center of the vehicle behind the operator's seat 160. The sprocket wheels 250 are rotatably mounted on mounting posts 251 which are disposed in the right and left mountings 118 which are attached to the frame. The posts 251 are provided with upper ends which are square in cross section for receiving a square center opening of the hand wheel 116 whereby when the hand wheel 116 is rotated on one of the posts 251, that post will rotate and the corresponding sprocket wheel 250 will also rotate, causing the respective sprocket chain 114 or 115 to rotate for rotating the rear sprocket wheels 252, which latter are mounted upon the posts 112 which then cause the worm gears 110 to rotate for raising or lowering the corresponding wheels 80.

The operator may raise and lower the rear wheels hydraulically by manipulating the hydraulic valves 240 and 242, which control the flow of hydraulic fluid to the hydraulic motors 154 and 155 respectively. The shafts of these two hydraulic motors are also integral with the sprockets 250 and the handwheels.

The vehicle receives its forward travel by means of the rotation of the front wheel 88. The front wheel 88 receives its rotary motion from the V-belt sheave 92, which latter receives its rotary motion from a further V-belt sheave 93 through the V-belt 126.

The V-belt sheave 93 receives its rotary motion from the hydraulic motor 124.

The operator may reverse the travel of the vehicle by manipulating the valve 168 near the driver's seat. The travel of the vehicle may also be reversed by turning the driving wheel 88 and motor 120 around 180 degrees.

In Figure 4 the constant delivery pump 122 is the source of hydraulic pressure. The fluid flows in the direction of the solid arrows. The control valves 168, 240, and 242 control the flow of hydraulic fluid to the hydraulic motors 124, 154, and 155 respectively. When the handles of the valves are in the position shown, the hydraulic fluid is by-passed by the pressure relief valve 123.

When the valves are moved to the positions shown by the dotted lines in Figure 4, the flow of hydraulic fluid is indicated by the dotted arrows. When this position is reversed to the position shown by a portion of the handle in dotted lines, the direction of flow of the hydraulic fluid is in an opposite direction than is shown by the dotted arrows and the hydraulic motor will operate in the opposite direction to that shown by the solid arrows.

In Figure 5 a modified means for raising and lowering the wheels is described in which 280 is a crank that is integral with the screw 282. A tubular internally threaded member 284, which is attached to the wheel mounting bracket 286, is telescopically disposed in the tubular guide 10. As the operator turns the crank the screw raises and lowers the wheel.

A cylindrical shaped member 290, which is integral with the bracket 286, is telescopically disposed within a tubular member 288, the latter being welded to the upper part of the frame. The bracket 286 is provided with a forwardly extending horizontal arm 287 which is attached to the lower side of the cylindrically shaped member 290.

The members 288 and 290 form a set of telescoping members, each rearward wheel having one such set.

Many types and sizes of crop spraying equipment can be used with the machine and can be arranged on the machine in many positions. For purposes of illustration only, one type is shown.

The crop spraying equipment is shown as located at the rear of the machine and comprises a tank 350, a gravity feed tube 354, a spray boom 358, and a shut-off valve 352.

The tank 350 is suspended between frame members 16 and 18 by means of brackets 360. The spray boom 358 is provided with a plurality of nozzles and is attached to frame members 32 and 34 transversely of the machine.

The insecticide is supplied to the spray boom through the gravity tube 354, which latter is provided with a shut-off valve 352.

In operation, the principal feature is the adjustment made for use of the machine on the side of a hill. Due to soil conservation practices, rows of crops sometimes are made to go around hills and diagonally across ditches.

When the machine is used for spraying on the side of a hill the operator adjusts the higher wheel to be closer to the frame than the wheel on the lower side, thus making the machine level. As the machine travels diagonally across a ditch adjustment may be made in the same way to keep the machine level and safe.

For changing the height of the machine to spray crops of different heights it is easy and necessary to adjust the height of all three wheels.

We claim:

In a variable height vehicle: a frame, two rearward and at least one forward spaced apart tubular members secured to said frame, said tubular members having vertical openings therein, elongated wheel carrying members disposed in said annular members respectively and being vertically slidable with respect thereto, wheels secured to the bottom of said wheel carrying members, means for raising and lowering said wheel carrying members independently of each other, and means for turning said forward wheel for steering the spaces between said wheels being substantially open up to at least the height of said wheels, and means for preventing pivoting of said rearward wheels and for maintaining said rearward wheels in parallelism comprising arms attached to said rearward wheel holding members and extending outwardly therefrom and transversely thereto, and two sets of two vertically telescoping members, each set being disposed above one of said arms respectively, one telescoping member of each set being attached to a respective arm and extending upwardly therefrom and the other telescoping member of each set being rigidly secured at its upper end to said frame.

References Cited in the file of this patent

UNITED STATES PATENTS

| | | |
|---|---|---|
| 1,117,836 | Griffith | Nov. 17, 1914 |
| 1,163,895 | Cross | Dec. 14, 1915 |
| 1,167,429 | Plummer | Jan. 11, 1916 |
| 1,370,347 | Nelson | Mar. 1, 1920 |
| 1,636,620 | Berry | July 19, 1927 |
| 2,012,973 | Parker | Sept. 3, 1935 |
| 2,468,801 | Beall | May 3, 1949 |
| 2,504,403 | Finley | Apr. 18, 1950 |

FOREIGN PATENTS

| | | |
|---|---|---|
| 296,555 | Great Britain | Sept. 26, 1928 |